May 18, 1965  L. C. CHOUINGS  3,183,671
FLUID PRESSURE BRAKING SYSTEMS
Filed March 6, 1963  5 Sheets-Sheet 5

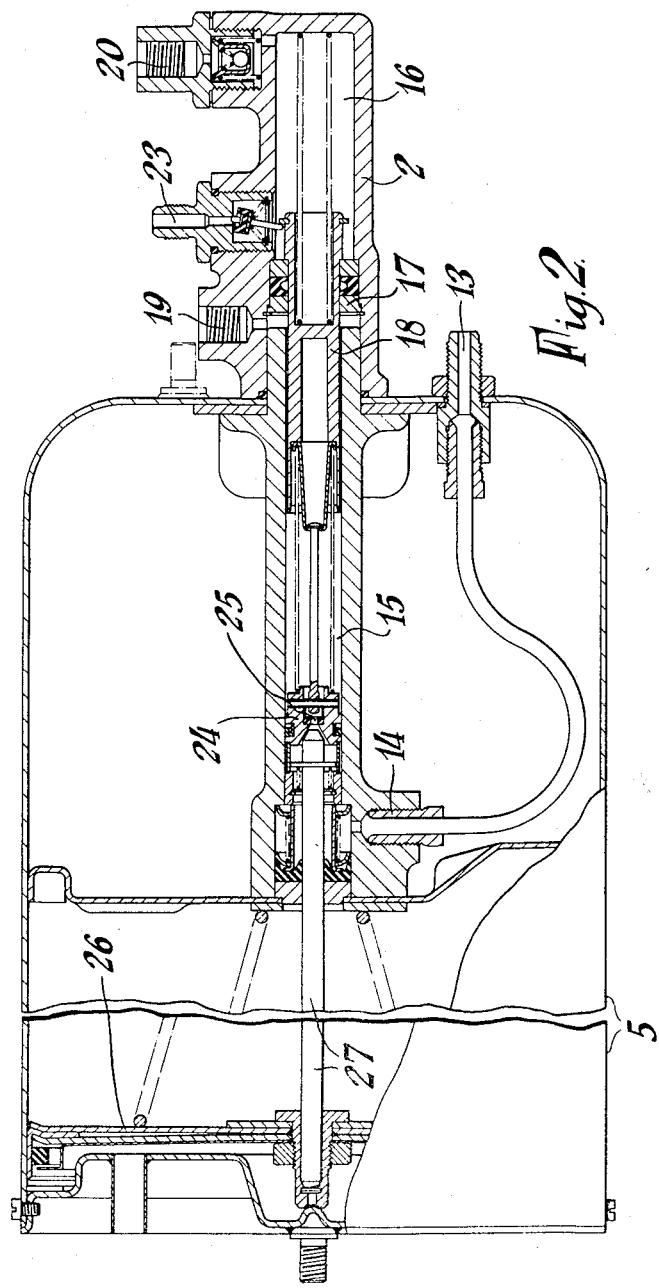

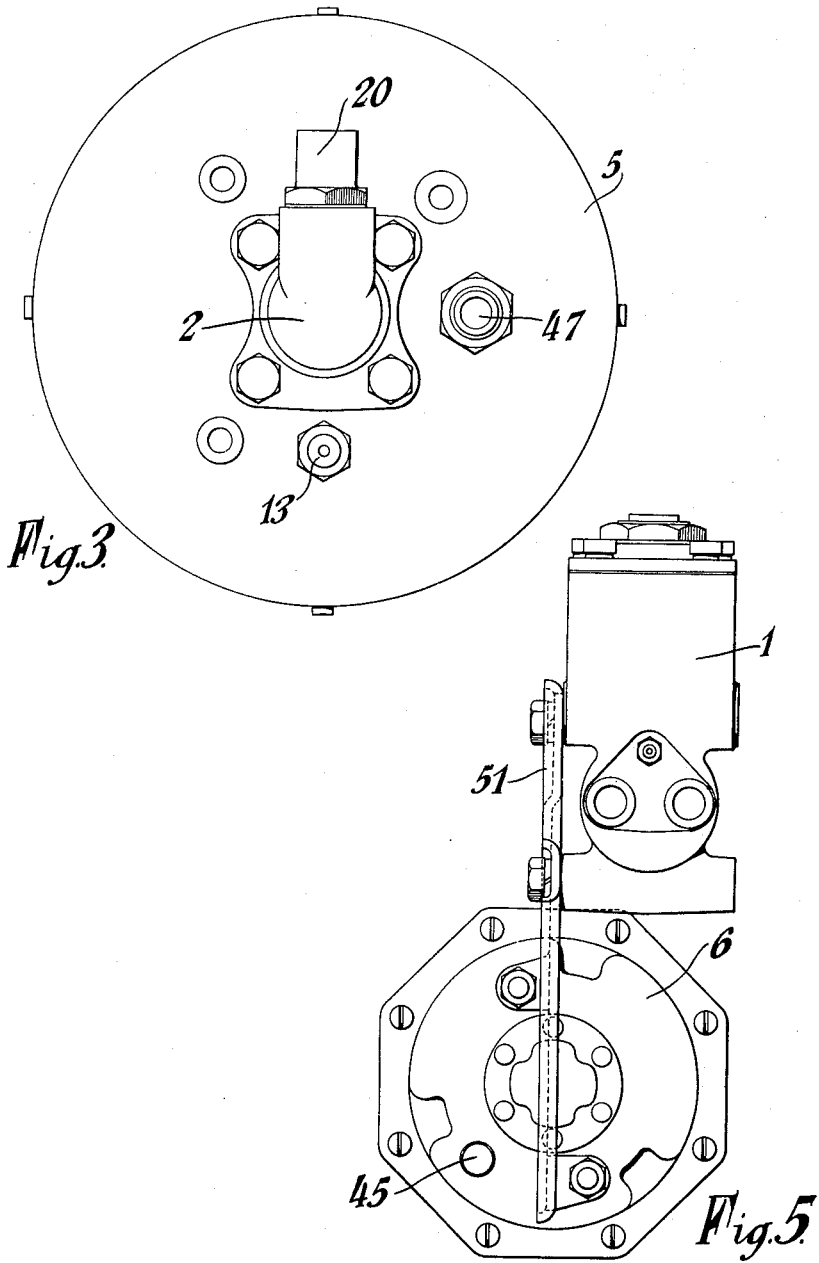

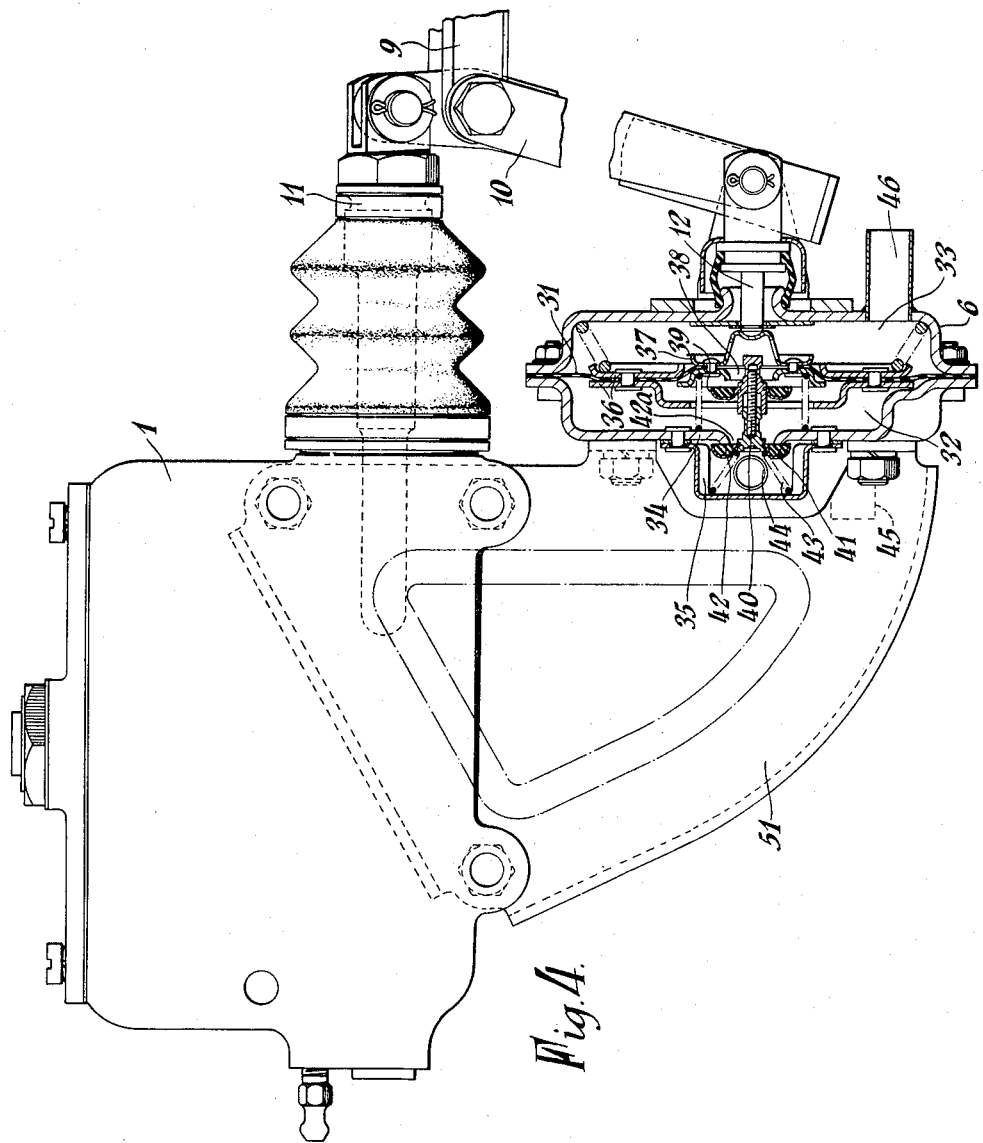

INVENTOR
Leslie C. Chouings
BY
Lawrence J. Winter
ATTORNEY

United States Patent Office 3,183,671
Patented May 18, 1965

3,183,671
FLUID PRESSURE BRAKING SYSTEMS
Leslie C. Chouings, Leamington Spa, England, assignor to Automotive Products Company Limited, Leamington Spa, England
Filed Mar. 6, 1963, Ser. No. 263,198
Claims priority, application Great Britain, Mar. 8, 1962, 9,028/62
2 Claims. (Cl. 60—54.5)

This invention relates to fluid pressure braking systems for vehicles.

The invention has for its object to provide for the independent operation of the brakes of the front and rear wheels of a vehicle so that the operation of the brakes of one set of road wheels is unimpaired in the event of failure of the fluid pressure supply to the brakes of the other set of road wheels.

In a fluid pressure braking system according to the present invention separate fluid pressure circuits are provided, one for actuating the brakes of the wheels of one set and the other for actuating the brakes of the wheels of the other set, fluid pressure to both said fluid pressure circuits being supplied either by separate master cylinders each of which is operated by fluid pressure from a further master cylinder actuated by a foot pedal or other operator control or only one of said separate fluid pressure circuits is supplied from a master cylinder operated by the further pedal operated master cylinder whilst the pressure fluid from the said pedal operated master cylinder is supplied to the other brake actuating fluid pressure circuit.

The system according to the invention can include servo means for assisting operation of the brakes the operation of the servo means being controlled by valve means operatively associated with the foot pedal or other operator control so as to be actuated thereby when the same is operated to effect a braking action.

One embodiment of the invention will now be described by way of example by aid of the accompanying drawings in which:

FIGURE 2 shows in longitudinal section a combined servo-device and master cylinder unit for the system disclosed in FIGURE 1;

FIGURE 3 is an end view of the unit as seen from the right of FIGURE 2;

FIGURE 4 is a view to a larger scale of a pedal or other operator control actuated master cylinder and servo control valve for the system of FIGURE 1;

FIGURE 5 is an end view as seen from the left of FIGURE 4, FIGURE 5 being drawn to a smaller scale;

Figure 1:
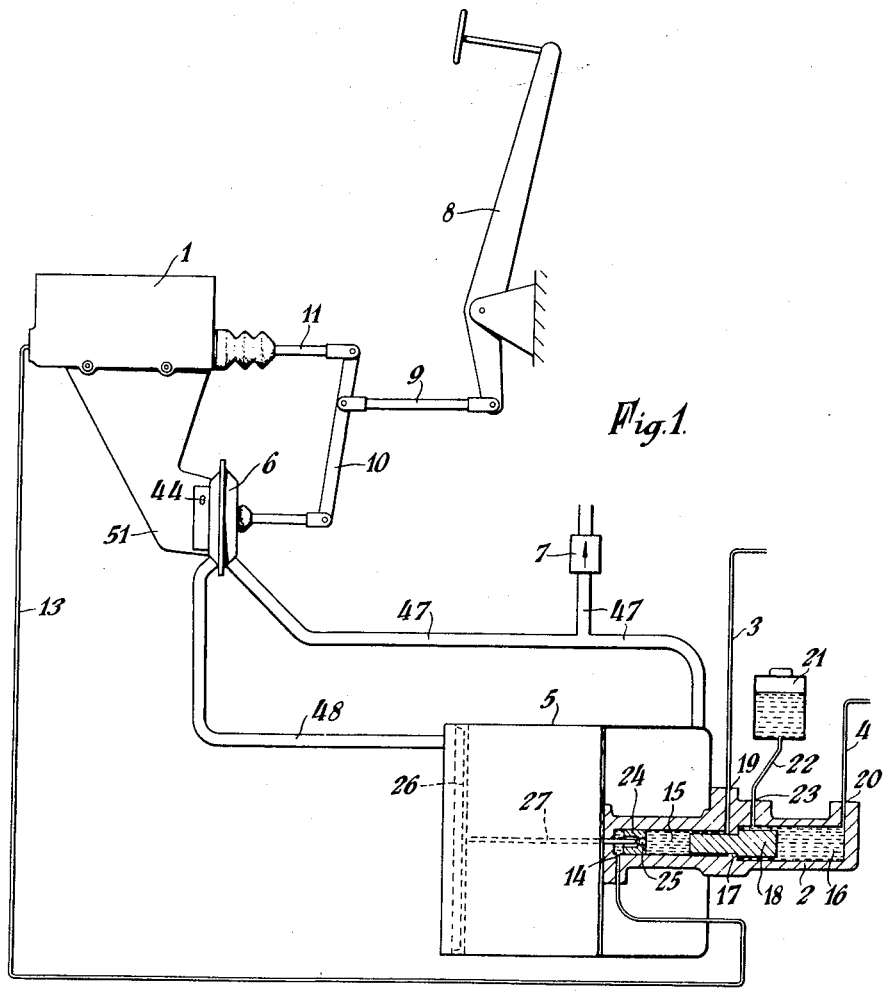
FIGURE 1 shows the system diagrammatically, the system including servo means for assisting operation of the brakes.
Figure 6:
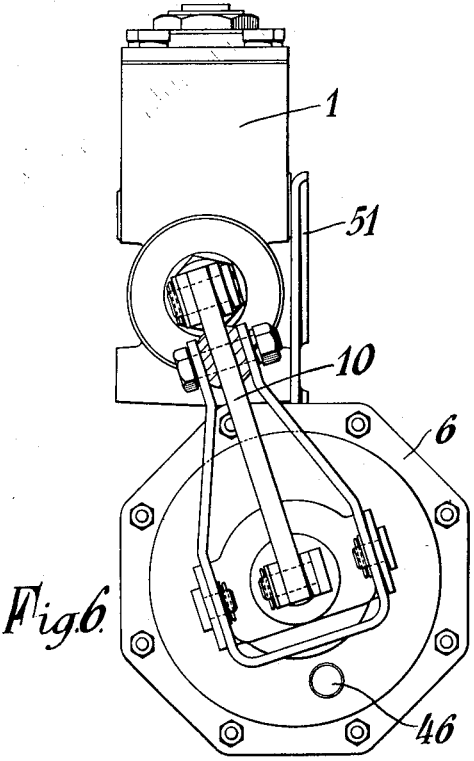
FIGURE 6 is an end view as seen from the right of FIGURE 4, FIGURE 6 being drawn to a smaller scale.
Figure 7:
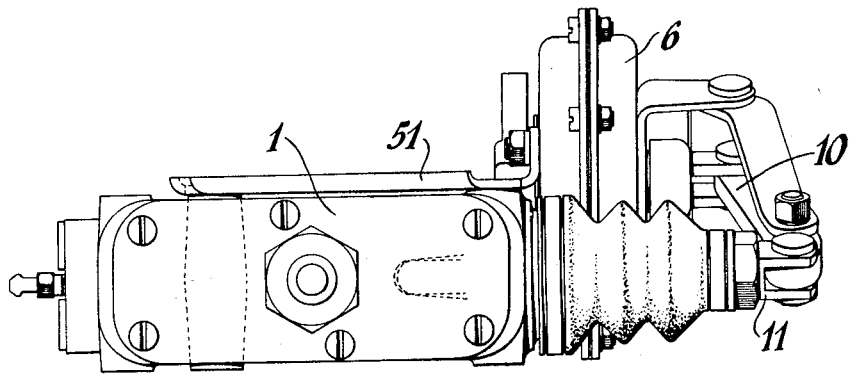
FIGURE 7 is a plan view of FIGURE 4 also drawn to a smaller scale.

In the system shown diagrammatically in FIGURE 1, hydraulic liquid from a pedal operated master cylinder 1, is supplied to a second master cylinder 2 having separate outlets, one of which is connectable by a pipe line 3 to the wheel cylinders of the brakes on one axle of the vehicle the other outlet being connectable by a pipe line 4 to the wheel cylinders of the brakes on the other axle of the vehicle. The second master cylinder 2 is associated with a servo-unit 5 connected to a source of fluid pressure either positive or negative and operable by actuation of a valve 6 associated with the foot pedal and arranged so as to be operated thereby. The arrangement is such that hydraulic liquid supplied to the second master cylinder 2 from the pedal operated master cylinder 1 is delivered by the pipe line 3 to the wheel cylinders connected thereto to operate the brakes on the one axle. The hydraulic liquid also effects operation of the second master cylinder 2 to supply hydraulic fluid from a separate source of supply connected to the master cylinder to the pipe line 4 whereby the wheel cylinders connected thereto are actuated and the brakes of the other axle operated. Operation of the foot pedal also effects actuation of the valve 6 such actuation of the valve resulting in operation of the servo-device to apply servo-assistance to the master cylinder 2.

Describing the system of FIGURE 1 in greater detail, with reference also to the particular apparatus shown in FIGURES 2 to 7. The foot pedal 8 (FIGURE 1) is connected by a connecting rod 9 to a lever 10. One end of the lever 10 is connected to the piston rod 11 of the master cylinder 1 the other end of the lever 10 being connected to the operating member 12 of the valve 6. The outlet from the pedal operated master cylinder 1 is connected by pipe line 13 to the inlet 14 adjacent one end of the smaller diameter portion 15 of the bore of the second master cylinder 2, the bore being of increased diameter for a further portion 16 of its length, an intermediate portion 17 of the bore forming a guide for a piston 18 which separates the two portions 15 and 16 hydraulically from one another to provide the two separate hydraulic circuits. The pipe line 3 is connected to an outlet port 19 in the portion 15 of the bore the pipe line 4 being connected to an outlet port 20 in the portion 16 of the bore, hydraulic liquid being supplied to this portion of the bore from a tank 21 connected by pipe line 22 to the inlet port 23.

The portion 15 of the bore of the second master cylinder also houses a second piston 24 having a central aperture 25 permitting the flow of hydraulic liquid from the pipe line 13 to pass to the pipe line 3. The second master cylinder 2 is mounted at one end of the servo-unit 5 which consists of a casing the interior of which contains a servo-piston 26. The servo-piston 26 has a piston rod 27 the free end of the piston rod extending into the bore of the second master cylinder 2 to provide a closure member for the aperture 25 in the second piston 24.

The valve 6 is of known construction and consists generally of a casing the interior of which is divided by a diaphragm 31 to form first and second chambers 32 and 33 respectively, a partition wall 34 providing a third chamber 35. The diaphragm 31 is clamped between two annular discs 36 and carries a spider 37 having a central aperture 38. The outer end of the aperture portion 38 provides a seating for a valve disc 39 which is carried by a valve rod 40. The valve rod 40 also carries a further valve disc 41 which co-operates with a seating 42 around an aperture 42a in the partition wall 34. The diaphragm is spring loaded so that the spring loading acts normally to maintain the seating of the central aperture 38 clear of the valve disc 39, the valve rod being acted on by a spring 43 so that the valve disc 41 is held on its seating. The third chamber 35 of the valve is open to atmosphere through a port 44 a filter (not shown) being provided for filtering air entering the third chamber, and the first and second chambers each have a port 45, 46 respectively.

The valve 6 is connected to a source of vacuum through a non-return valve shown diagrammatically at 7. A branched pipe line 47 connects the non-return valve 7 to the servo-cylinder space on one side of the piston 26 and to the port 46 of the valve 6, the cylinder space on the other side of the piston 26 being connected by pipe line 48 to the port 45 of valve 6.

The valve 6 is supported by a bracket 51 secured to the body of the pedal operated master cylinder 1, the valve operating member 12 being as previously referred to, connected to the lever 10, the inner end of the operating member bearing against the valve diaphragm spider.

In operation, upon depression of the foot pedal 8, pressure is created in the hydraulic circuit, herein referrred to as the primary circuit, consisting of pipe line 13, bore portion 15 of the second master cylinder pipe line 3 and the wheel cylinders connected thereto. The pressure in this primary circuit also acts on the piston 18 so that a corresponding pressure is created in the hydraulic circuit, herein referred to as the secondary circuit, and consisting of the bore portion 16, pipe line 4 and wheel cylinders connected thereto. The depression of the foot pedal results in movement of the lever 10 this movement causing the valve operating member 12 of valve 6 to move to the left so that the diaphragm is moved to the left and valve disc closes the aperture 38 the valve rod 40 being axially displaced so that the valve disc 41 is unseated. Actuation of the valve as above described results in air being supplied through the pipe line 48 to the appropriate side of the servo-piston 26 the resulting displacement of the piston applying a servo-action to the master cylinder 2. The total output pressure from the servo-piston is, therefore, the pressure generated by the servo-piston plus pressure generated due to the pressure generated by operation of master cylinder 1 acting on the piston 18 in the second master cylinder 2.

With the system above described failure of the following hydraulic lines or connections set out in the headings will result in the conditions referred to.

(i) *Failure of hydraulic input (pipe line 13) or output to wheel cylinders of pipe line 3*

On application of pedal 8 the piston of master cylinder 1 travels onto its forward stop enabling valve 6 to be operated this directs atmospheric pressure to the rear of the servo power piston 26 and hydraulic pressure is thus produced in the secondary circuit only actuating the wheel cylinders connected to pipe line 4.

(ii) *Failure of secondary hydraulic circuit*

On application of pedal 8 master cylinder 1 and valve 6 functions as already described this raised pressure in primary circuit thus providing actuation of wheel cylinders connected to pipe line 3.

(iii) *Failure at the vacuum source*

On failure at the vacuum source, non-return valve 7 seats, thus preventing atmospheric pressure from entering the vacuum system. Assuming that the system was exhausted to the specified degree of vacuum one application of brakes with full servo-assistance will be possible, further application of brakes with less assistance can be obtained until the reservoir capacity of the servo has been used up.

(iv) *Failure of valve 7*

This would result in brake operation without servo-assistance.

I claim:
1. A fluid pressure braking system for vehicles comprising a first and a second master cylinder, said second master cylinder having two spaced separate outlets forming first and second hydraulic circuits for applying fluid pressure to two separate sets of brakes, an hydraulic line connecting said first and second cylinders to each other for supplying fluid pressure directly to said first circuit, a first piston in said second cylinder disposed between said spaced outlets for supplying fluid pressure indirectly to said second circuit, a fluid pressure operated servo device operatively connected to said second master cylinder to assist brake operation, servo device valve operatively connected to said servo device for operation thereof, a bracket secured to said first master cylinder and supporting said valve, a movable operating rod member extending into said first master cylinder, a movable operating member extending into said valve, a lever connected at its opposite ends to said rod member and valve operating member, a connecting rod secured to said lever for movement thereof to operate said first master cylinder and valve, and pedal means operatively connected to said connecting rod for positive and joint operation of said first cylinder and valve.

2. The braking system of claim 1 wherein hydraulic fluid tank means communicate with the side of said piston in communication with said second circuit.

References Cited by the Examiner
UNITED STATES PATENTS
3,068,651 12/62 Shutt _____ 188—152 X FOREIGN PATENTS
769,665 3/57 Great Britain.
769,775 3/57 Great Britain.
876,049 5/53 Germany.

EUGENE G. BOTZ, *Primary Examiner.*